United States Patent
Rotramel et al.

[11] Patent Number: 5,950,599
[45] Date of Patent: Sep. 14, 1999

[54] METHOD OF DETERMINING THE COMPOSITION OF FUEL IN A FLEXIBLE FUELED VEHICLE WITHOUT AN $O_2$ SENSOR

[75] Inventors: William D. Rotramel, Plymouth; Yi Cheng, Jackson; Mark E. Hope; Shean Huff, both of Ann Arbor; Mary Joyce, Farmington Hills; Howard W. Krausman, Dexter; Richard K. Moote, Ann Arbor; John M. Prevost, Jackson; Gary L. Seitz, Chelsea; Patrick T. McCourt, Auburn Hills, all of Mich.

[73] Assignee: Chrysler Corporation, Auburn Hills, Mich.

[21] Appl. No.: 08/959,791

[22] Filed: Oct. 29, 1997

[51] Int. Cl.$^6$ ..................................... F02M 7/00
[52] U.S. Cl. ............................. 123/436; 123/1 A
[58] Field of Search ................. 123/1, 436, 688

[56] References Cited

U.S. PATENT DOCUMENTS

| | | |
|---|---|---|
| 5,255,661 | 10/1993 | Nankee, II et al. . |
| 5,335,637 | 8/1994 | Davis et al. . |
| 5,365,917 | 11/1994 | Adams et al. . |
| 5,400,762 | 3/1995 | Fodale et al. . |
| 5,415,145 | 5/1995 | Letcher et al. . |
| 5,433,185 | 7/1995 | Toyoda ..................................... 123/688 |
| 5,435,285 | 7/1995 | Adams et al. . |
| 5,467,755 | 11/1995 | Konrad et al. . |
| 5,497,753 | 3/1996 | Kopera . |
| 5,505,183 | 4/1996 | Sinha et al. ............................. 123/688 |
| 5,520,162 | 5/1996 | Rotramel et al. . |
| 5,570,673 | 11/1996 | Isobe ....................................... 123/688 |
| 5,685,284 | 11/1997 | Nakamichi .............................. 123/688 |
| 5,724,953 | 3/1998 | Jung ........................................ 123/688 |
| 5,762,055 | 6/1998 | Yamashita et al. ..................... 123/688 |

Primary Examiner—John Kwon
Attorney, Agent, or Firm—Mark P. Calcaterra

[57] ABSTRACT

The present invention is directed towards a method of controlling combustion parameters of an internal combustion engine prior to oxygen sensor feedback availability for a flexible fueled vehicle. If the vehicle has previously been running on ethanol or has been using ethanol in the recent past, a first strategy is employed which basis engine fueling on the minimum of a theoretically appropriate fueling value and a theoretically calculated value. If the vehicle has not previously been running on ethanol or has not been using ethanol in the recent past, a second strategy is employed which basis engine fueling on the minimum of the theoretically appropriate fueling value, the theoretically calculated value and a roughness calculated value.

18 Claims, 1 Drawing Sheet

METHOD OF DETERMINING THE COMPOSITION OF FUEL IN A FLEXIBLE FUELED VEHICLE WITHOUT AN $O_2$ SENSOR

BACKGROUND OF THE INVENTION

1. Technical Field

The present invention relates generally to fuel control systems and, more particularly, to a method of determining the percent alcohol content of a fuel used in a motor vehicle capable of operating on more than one type of fuel.

2. Discussion

Environmental and energy independence concerns have stimulated the development of alternative transportation fuels, such as alcohol fuels, for use in automobiles. Alcohol fuels include methanol and ethanol. A flexible fueled vehicle capable of operating on gasoline, or alcohol fuel, or any mixture of the two fuels, is therefore in demand. Modifications to the engine are necessary when operating on different fuels because of the different characteristics of each fuel. For example, an engine operating on ethanol or E85 (a blend of 85% ethanol and 15% gasoline) requires approximately 1.4 times the amount of fuel relative to gasoline at stoichiometry due to a lower energy content of the ethanol.

Air/fuel ratio in internal combustion engine design is typically considered to be the ratio of mass flow rate of air to mass flow rate of fuel inducted by an internal combustion engine to achieve conversion of the fuel into completely oxidized products. The chemically correct ratio corresponding to complete oxidation of the products is called stoichiometric. If the air/fuel ratio is less than stoichiometric, an engine is said to be operating rich, i.e., too much fuel is being burned in proportion to the amount of air to achieve perfect combustion. Likewise, if the air/fuel ratio is greater than stoichiometric, an engine is said to be operating lean, i.e., too much air is being burned in proportion to the amount of fuel to achieve perfect combustion. Alcohol fuels have a lower air/fuel ratio than gasoline at stoichiometric, so that the engine must be compensated for in the rich direction as the percentage of alcohol in the fuel increases.

U.S. Pat. No. 5,255,661, entitled "Method for Determining Fuel Composition Using Oxygen Sensor Feedback Control", hereby expressly incorporated by reference, discloses a method for determining the percent alcohol content of fuel in the fuel tank utilizing an oxygen sensor feedback control loop to sense changes in air/fuel ratio and relay that information to the engine controller so that dependant variables can be adjusted accordingly. However, oxygen sensors take a predetermined amount of time to warm-up to a reliable state, particularly on cold starts. As such, fuel composition learning systems cannot be used until an oxygen sensor is functioning correctly after the vehicle has been filled with fuel.

A potential for drivability deficiencies exist during the warm-up time frame if the vehicle has been recently filled with a fuel blend (i.e., alcohol and gasoline) which differs from the old fuel blend in the fuel tank. Drivability deficiencies often occur if the blended fuel after the fill has entered the intake manifold and new fueling parameters have not yet been determined. Therefore, it would be desirable to provide a method for determining the percent alcohol content of a newly blended fuel prior to its delivery to the intake manifold and prior to oxygen sensor feedback availability.

SUMMARY OF THE INVENTION

It is, therefore, one object of the present invention to provide a system of flexible fuel compensation.

It is another object of the present invention to provide a flexible fuel compensation system which minimizes drivability deficiencies when a change in the percent alcohol content of the fuel occurs on a fill.

It is yet another object of the present invention to provide a flexible fuel compensation system which correctly and effectively uses learned percent alcohol content information concerning the fuel used to fill the vehicle.

The above and other objects are provided by a method of determining the percent alcohol content of a fuel used in a flexible fueled vehicle prior to oxygen sensor feedback availability. According to the present invention, a fueling strategy is employed which bases the engine fueling on the minimum of a theoretically appropriate fueling value and a theoretically calculated value if the vehicle has been running on ethanol fuel since the last tank fill or has been using ethanol in the recent past. If the vehicle has not been running on ethanol since the last tank fill or has not been using ethanol in the recent past, a different strategy is employed which bases the engine fueling on the minimum of a roughness calculated value, the theoretically appropriate fueling value, and the theoretically calculated value. As such, drivability deficiencies are accommodated when a vehicle is started cold after a fuel fill and before the learned percent alcohol content can be determined based on oxygen sensor feedback.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

Figure 1:
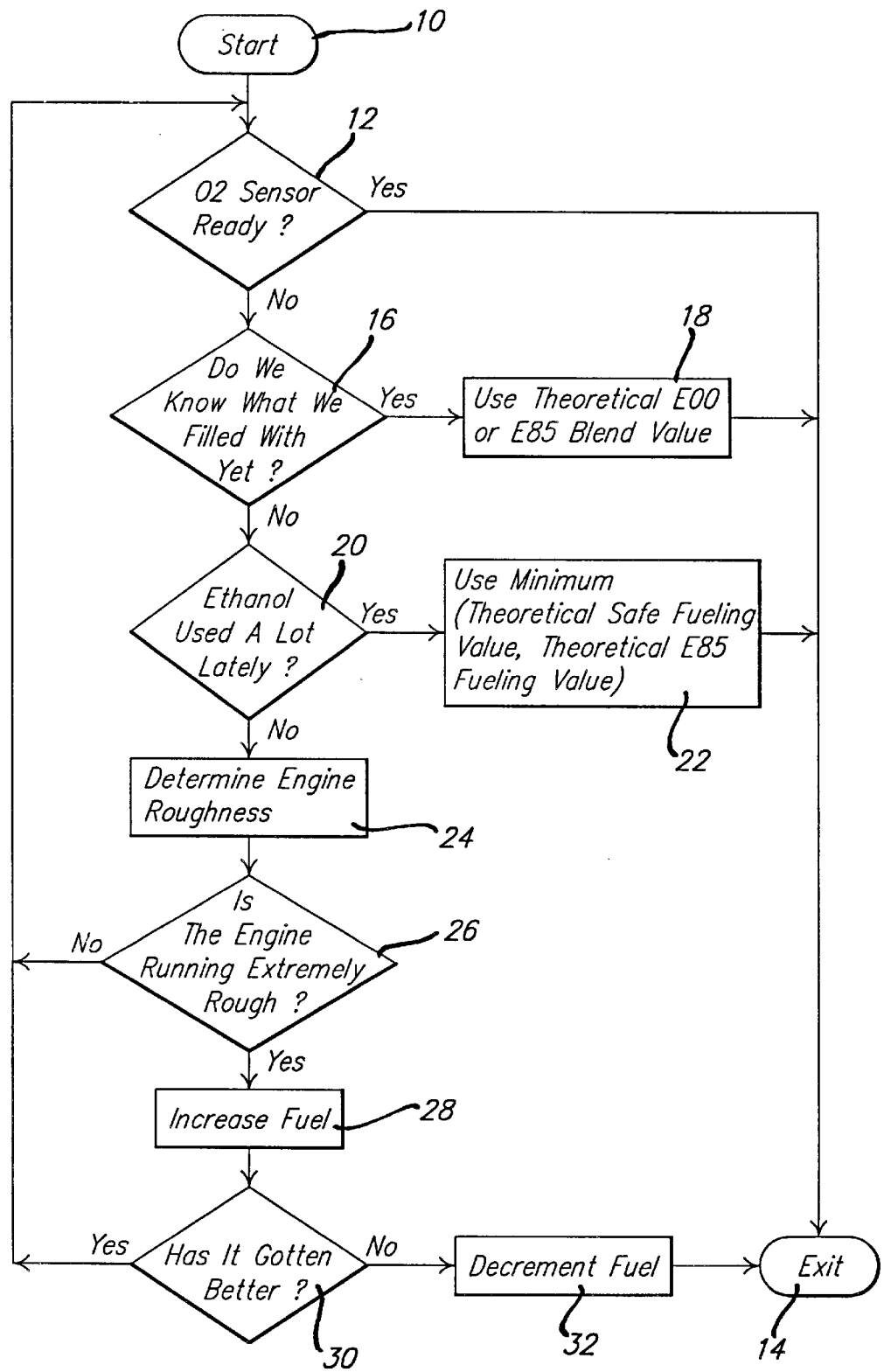
FIG. 1 is a flow chart of a method of flexible fuel compensation control for a flexible fuel compensation system of a flexible fueled vehicle.

The present invention is directed towards a method of determining the percent alcohol content of a fuel used in a flexible fueled vehicle prior to oxygen sensor feedback availability. The methodology allows the flexible fueled vehicle to run effectively until a closed loop operating mode occurs or until a more accurate determination of the percent alcohol content of the fuel has been made. For instance, a detailed explanation of a method for accurately determining the percent alcohol content of the fuel may be found in U.S. Ser. No. 08/958,411, entitled "Method of Determining the Composition of Fuel in a Flexible Fueled Vehicle" to Nankee II et al. which is hereby expressly incorporated by reference herein. For the purposes of this specification, a closed loop operating mode refers to a state of engine operation in which feedback and fuel control changes are based on a functioning, accurate oxygen sensor. As is known, a vehicle may run for a significant time after a fuel tank fill before a closed loop operating mode occurs during very cold starts. The present invention provides an effective means of accommodating vehicle operation so as to avoid vehicle die-outs and drivability deficiencies during this period of time.

If the vehicle has previously been running on ethanol fuel (i.e., since the last fuel tank fill), or has been using ethanol in the recent past, a first control strategy is employed. The first control strategy basis the engine fueling parameters on the minimum of either a predetermined theoretically appropriate fueling value or a theoretically calculated blend value. The appropriate fueling value allows the vehicle to run adequately, but may sacrifice performance abilities on certain percentages of ethanol in the tank. The theoretically calculated blend value accomplishes the same operational goals, while sacrificing less performance abilities.

The theoretically appropriate fueling value varies with engine displacement but is commonly near E65 (65% ethanol and 35% gasoline). Furthermore, the theoretically calculated blend value includes an E0 blend value (0% ethanol and 100% gasoline) and an E85 blend value (85% ethanol and 15% gasoline). The theoretically calculated E0 blend value is used if E0 fuel was added to the tank and the theoretically calculated E85 blend value is used if E85 fuel was added to the tank. The type of fuel added to the tank is determined by a prediction technique based on a preliminary output from the oxygen sensor. The theoretically calculated values are determined by the following equations:

$E0$ possibility=(old concentration)*(old vol.)/(new vol.); and $E85$ possibility=[(old concentration)*(old vol.)+(85% ethanol)*(added vol.)]/(new vol.).

A second control strategy is employed if the vehicle has not previously been running on ethanol or has not been using ethanol in the recent past. The second control strategy basis the engine fueling parameters on the minimum of either the predetermined theoretically appropriate fueling value, the theoretically calculated blend value or a roughness calculated value. Under both control strategies, the theoretically calculated blend value assumes that pure ethanol fuel was added to the tank.

The roughness calculated value corresponds to the roughness of engine operation and is based on the second derivative of engine speed (RPM). As is known in the relevant art, acceleration is the first derivative of RPM and jerk is the second derivative. Accordingly, the roughness calculated value is a filtered jerk value. During cold starts, when the oxygen sensor is not active, the roughness calculated value is determined every 120° of crank rotation on a six cylinder engine or every 180° of crank rotation on a four cylinder engine. If the roughness calculated value becomes greater than a predetermined level, the methodology of the present invention assumes that the vehicle is running on fueling parameters set according to an incorrect fueling value (i.e., percent alcohol content).

When the error is detected, the roughness calculated value is incremented by a preselected percentage. If a certain number of engine pick-up pulses have elapsed since incrementing the roughness calculated value, and the rough engine operation does not improve by a preselected amount, the methodology assumes that the problem is something other than the determination of the percent ethanol content. At this point, the previously incremented percentage of the roughness calculated value is decremented out and the roughness calculation is no longer trusted.

In contrast, if the roughness of the engine operation has improved but the engine is still running more rough than a preselected threshold, the roughness calculated value is incremented again and the engine is re-evaluated for roughness. It should be noted that the roughness calculated value is no longer trusted once the flexible fuel control system decrements the roughness calculated value.

Turning now to the drawing figure, FIG. 1 illustrates a flow chart for the method of flexible fuel compensation control prior to oxygen sensor feedback availability. The methodology starts in bubble 10 and advances to decision block 12. In decision block 12, the methodology determines if the vehicle's oxygen sensor is functioning. If the vehicle's oxygen sensor is operating properly, the methodology advances to bubble 14 where it exits the routine so that a standard percent alcohol content learning system based on oxygen sensor feedback availability may be employed for controlling the fueling parameters of the flexible fueled vehicle. Thereafter, the methodology restarts at bubble 10 on a periodic basis according to engine crank revolution.

However, if the oxygen sensor is not functioning at decision block 12, the methodology advances to decision block 16. In decision block 16, the methodology determines if the percent alcohol content of the newly added fuel has been determined. This would be the case when the oxygen sensor begins to output a percent alcohol content of the fuel prior to reaching a closed loop mode upon which a percent alcohol content (i.e., E0 or E85) of the newly added fuel can be based. If so, the methodology advances to block 18. In block 18, the methodology implements engine operating parameters based on the theoretically calculated E0 blend value or the theoretically calculated E85 blend value detailed above.

From block 18, the methodology advances to bubble 14 where it exits the routine until another running thereof is called for by the engine control unit based on engine crank revolution. Referring again to decision block 16, if the percent alcohol content of the newly added fuel has not yet been determined, the methodology advances to decision block 20. Ah decision block 20, the methodology determines if the vehicle has had a recent history of operating on an ethanol-based fuel. This is indicated by a counter stored in the engine controller reaching a level indicative of ethanol content being detected on previous fuel tank fills.

If the vehicle has a recent history of operating on an ethanol-based fuel, the methodology advances to block 22 and implements engine operating parameters based on the minimum of either the predetermined theoretically appropriate fueling value or the theoretically calculated E85 fueling value. From block 22, the methodology advances to bubble 14 where it exits the routine.

If the engine operating parameters have not been recently based on ethanol fuel at decision block 20, the methodology advances to block 24. In block 24, the methodology determines the roughness calculated value which, as described above, is indicative of the level of engine operating roughness. From block 24, the methodology advances to decision block 26 and compares the level of determined engine roughness to a preselected roughness threshold.

If the roughness calculated value is less than the threshold, the methodology is returned to decision block 12. However, if the roughness calculated value is greater than the preselected threshold, the methodology advances to block 28 and increments the roughness calculated value a predetermined percentage so as to increase the amount of fuel being delivered to the engine such that a greater fuel to air ratio is established. From block 28, the methodology advances to decision block 30.

In decision block 30, the methodology determines if the level of engine operating roughness has improved. If so, the methodology returns to decision block 12 and continues the loop. However, if the engine operating roughness has not improved, the methodology advances to block 32 and decrements out the previous incrementing of the roughness calculated value to return the fuel to air ratio to its prior state. From block 32, the methodology advances to bubble 14 where it exits the routine.

According to the above, the present invention provides a flexible fuel control system for a flexible fueled vehicle suitable for providing theoretical fueling parameters for engine operation prior to oxygen sensor feedback data availability. The percent alcohol content of the fuel is set according to one of a predetermined appropriate fueling value, a theoretically calculated value and a roughness calculated value. As such, drivability deficiencies that may occur when the newly blended fuel reaches the intake manifold of the vehicle prior to a closed loop mode can be avoided.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of controlling combustion parameters of an internal combustion engine prior to oxygen sensor feedback availability in a flexible fueled vehicle comprising:

determining if an oxygen sensor in a fuel system of said flexible fuel vehicle is functioning; and setting said combustion parameters according to one of a group including a theoretically appropriate fueling value, a theoretically calculated blend value and a roughness calculated value;

wherein said combustion parameters are set according to said theoretically calculated blend value if a percent alcohol content of newly added fuel to a tank of said vehicle has previously been determined.

2. The method of claim 1 wherein said theoretically calculated blend value further comprises a first value based on E0 fuel being added to said tank and a second value based on E85 fuel being added to said tank.

3. The method of claim 2 wherein said first and second values correspond to blend characteristics of said fuel system, an amount of fuel delivered since a fuel blending period started, and a previous ethanol percentage in said tank.

4. The method of claim 1 wherein said theoretically safe fueling value corresponds to engine displacement.

5. A method of controlling combustion parameter of an internal combustion engine prior to oxygen sensor feedback availability in a flexible fueled vehicle comprising:

determining if an oxygen sensor in a fuel system of said flexible fuel vehicle is functioning; and setting said combustion parameters according to one of a group including a theoretically appropriate fueling value, a theoretically calculated blend value and a roughness calculated value;

wherein said combustion parameters are set according to a minimum of said theoretically appropriate fueling value and said theoretically calculated blend value if said internal combustion engine was operating on ethanol fuel prior to a last fuel fill.

6. The method of claim 5 wherein said theoretically calculated blend value further comprises a first value based on E0 fuel being added to said tank and a second value based on E85 fuel being added to said tank.

7. The method of claim 6 wherein said first and second values correspond to blend characteristics of said fuel system, an amount of fuel delivered since a fuel blending period started, and a previous ethanol percentage in said tank.

8. The method of claim 5 wherein said theoretically safe fueling value corresponds to engine displacement.

9. The method of claim 8 wherein said theoretically calculated blend value further comprises a first value based on E0 fuel being added to said tank and a second value based on E85 fuel being added to said tank.

10. The method of claim 9 wherein said first and second values correspond to blend characteristics of said fuel system, an amount of fuel delivered since a fuel blending period started, and a previous ethanol percentage in said tank.

11. The method of claim 8 wherein said combustion parameters are set according to said roughness calculated value if said internal combustion engine is operating rougher than a given threshold.

12. The method of claim 11 further comprising incrementing said roughness calculated value if said internal combustion engine is operating rougher than said threshold.

13. The method of claim 12 further comprising decrementing said incremented roughness calculated value if said internal combustion engine does not operate less rough after incrementing said roughness calculated value.

14. The method of claim 13 further comprising determining if said internal combustion engine is operating less rough after a preselected number of engine pick-up pulses have elapsed since said roughness calculated value was incremented.

15. A method of controlling combustion parameters of an internal combustion engine prior to oxygen sensor feedback availability in a flexible fueled vehicle comprising:

determining if an oxygen sensor in a fuel system of said flexible fuel vehicle is functioning; and setting said combustion parameters according to one of a group including a theoretically appropriate fueling value, a theoretically calculated blend value and a roughness calculated value;

wherein said combustion parameters are set according to a minimum of said theoretically appropriate fueling value, said theoretically calculated blend value and said roughness calculated value if said internal combustion engine was not operating on ethanol fuel prior to a last fuel fill.

16. The method of claim 15 wherein said theorem tically safe fueling value corresponds to engine displacement.

17. A method of controlling combustion parameters of an internal combustion engine prior to oxygen sensor feedback availability in a flexible fueled vehicle comprising:

determining if an oxygen sensor in a fuel system of said flexible fuel vehicle is functioning; and setting said combustion parameters according to one of a group including a theoretically appropriate fueling value, a theoretically calculated blend valle and a roughness calculated value;

wherein said roughness calculated value corresponds to a second derivative of engine speed.

18. A method of controlling combustion parameters of an internal combustion engine prior to oxygen sensor feedback availability in a flexible fueled vehicle comprising:

determining if an oxygen sensor in a fuel system of said flexible fuel vehicle is functioning; and setting said combustion parameters according to one of a group including a theoretically appropriate fueling value, a theoretically calculated blend value and a roughness calculated value;

wherein said roughness calculated value is calculated approximately every 120° for a six cylinder engine and approximately every 180° for a four cylinder engine.

* * * * *